United States Patent
Lin et al.

(10) Patent No.: US 10,926,522 B2
(45) Date of Patent: Feb. 23, 2021

(54) ELECTRONIC DEVICE WITH LAMINATED STRUCTURE AND MANUFACTURING METHOD THEREOF

(71) Applicant: OPTERA TECHNOLOGY (XIAMEN) .CO.LTD, Xiamen (CN)

(72) Inventors: Yuezhan Lin, Xiamen (CN); Xu Zhang, Fuzhou (CN); Wei Huang, Nanning (CN)

(73) Assignee: TPK TOUCH SOLUTIONS (XIAMEN) INC., Xiamen (CN)

( * ) Notice: Subject to any disclaimer, the term of this patent is extended or adjusted under 35 U.S.C. 154(b) by 259 days.

(21) Appl. No.: 14/859,366

(22) Filed: Sep. 21, 2015

(65) Prior Publication Data

US 2016/0009065 A1    Jan. 14, 2016

Related U.S. Application Data

(62) Division of application No. 13/547,057, filed on Jul. 12, 2012, now abandoned.

(30) Foreign Application Priority Data

Oct. 15, 2011  (CN) .......................... 201110324524.2

(51) Int. Cl.
*B32B 37/10* (2006.01)
*B32B 7/12* (2006.01)
(Continued)

(52) U.S. Cl.
CPC ............ *B32B 37/1009* (2013.01); *B32B 7/10* (2013.01); *B32B 7/12* (2013.01); *B32B 17/10761* (2013.01); *B32B 17/10807* (2013.01); *B32B 37/12* (2013.01); *B32B 38/0036* (2013.01); *B32B 2037/1253* (2013.01);
(Continued)

(58) Field of Classification Search
CPC . B32B 37/1009; B32B 37/12; B32B 38/0036; B32B 17/10761; B32B 17/10807; B32B 7/10; B32B 7/12; B32B 2037/1253; B32B 2307/20; B32B 2307/40;
(Continued)

(56) References Cited

U.S. PATENT DOCUMENTS 2,120,628 A * 6/1938 Reid ................. B32B 17/10605
                                                        428/437
3,311,517 A * 3/1967 Rankin ............... B29C 43/3642
                                                        156/104
(Continued)

*Primary Examiner* — Christopher T Schatz
*Assistant Examiner* — Cynthia L Schaller
(74) *Attorney, Agent, or Firm* — Cooper Legal Group, LLC

(57) ABSTRACT

The present disclosure relates to an electronic device, and more particularly, to an electronic device with laminated structure and a manufacturing method thereof. The electronic device comprises: a first substrate; a second substrate; and a solid-state adhesive layer, wherein the adhesive layer is disposed between the first substrate and the second substrate. The solid-state adhesive layer reacts with the first substrate and the second substrate to form a chemically linked chain for bonding the first substrate and the second substrate. The present disclosure further selects a solid-state adhesive with both physical and chemical cohesiveness to laminate the two substrates; thereby making an electronic device more firm with higher shock resistance.

20 Claims, 4 Drawing Sheets

(51) Int. Cl.
  *B32B 17/10* (2006.01)
  *B32B 7/10* (2006.01)
  *B32B 37/12* (2006.01)
  *B32B 38/00* (2006.01)

(52) U.S. Cl.
  CPC ....... *B32B 2307/20* (2013.01); *B32B 2307/40* (2013.01); *B32B 2329/06* (2013.01); *B32B 2457/20* (2013.01); *B32B 2457/208* (2013.01); *Y10T 156/10* (2015.01); *Y10T 428/31855* (2015.04)

(58) Field of Classification Search
  CPC .......... B32B 2329/06; B32B 2457/208; B32B 2457/20; Y10T 428/31855; Y10T 156/10
  See application file for complete search history.

(56) References Cited

U.S. PATENT DOCUMENTS

| | | | | |
|---|---|---|---|---|
| 3,625,792 A * | 12/1971 | Shaffer | ............ | B32B 17/10018 156/214 |
| 4,276,351 A * | 6/1981 | Phillips | ............ | B32B 17/10605 428/437 |
| 4,642,255 A * | 2/1987 | Dlubak | ............ | B32B 5/02 156/100 |
| 5,028,287 A * | 7/1991 | Herliczek | ......... | B32B 17/10064 156/102 |
| 5,147,485 A * | 9/1992 | Gajewski | ............ | B32B 37/02 156/104 |
| 5,456,372 A * | 10/1995 | Solinov | ............ | B32B 17/10018 216/34 |
| 5,698,053 A * | 12/1997 | Carroll | ............ | B32B 17/10018 156/103 |
| 5,724,187 A * | 3/1998 | Varaprasad | ............. | B32B 17/06 359/265 |
| 2004/0185195 A1* | 9/2004 | Anderson | ......... | B32B 17/10036 428/34 |
| 2007/0009714 A1* | 1/2007 | Lee | ................... | B32B 17/10568 428/172 |
| 2008/0302461 A1* | 12/2008 | Hayes | ............... | B32B 17/10018 156/99 |
| 2010/0123675 A1* | 5/2010 | Ippel | ...................... | G06F 3/044 345/173 |
| 2010/0309164 A1* | 12/2010 | Yeh | ......................... | G06F 3/044 345/174 |
| 2012/0152332 A1* | 6/2012 | Luo | .................... | B32B 17/10972 136/251 |

\* cited by examiner

| Height (CM) / Result | 30 | 40 | 50 | 55 | 60 | 65 |
|---|---|---|---|---|---|---|
|  | good | Broken |  |  |  |  |

Table 1

FIG. 3

| Number / Project | 1 | 2 | 3 | 4 | Maximum | Minimum | mean |
|---|---|---|---|---|---|---|---|
| Height (cm) | 50 | 70 | 110 | 125 | 125 | 50 | 89 |
| Result | good | good | good | good |  |  |  |

Table 2

FIG. 4

ELECTRONIC DEVICE WITH LAMINATED STRUCTURE AND MANUFACTURING METHOD THEREOF

This application claims the benefit of Chinese application No. 201110324524.2, filed on Oct. 15, 2011. This application is a Divisional application of Ser. No. 13/547,057, filed Jul. 12, 2012, now pending, by the present inventors, which is incorporated herein by reference.

BACKGROUND OF THE INVENTION

1. Field of the Related Art

The present disclosure relates to an electronic device, and more particularly, to an electronic device with a laminated structure and a manufacturing method thereof.

2. Description of the Related Art

Optical clear adhesive is widely used in electronic devices such as mobile phones, personal digital assistances or palmtop personal computers, wherein the optical clear adhesive serves as a lamination material between internal components in these electronic devices.

At present, optical clear adhesives include pressure-sensitive adhesives, acrylic adhesives and so on. People usually use physical properties such as, tensile force between molecules of the adhesives and interpenetration of molecules of an optically clear adhesive for bonding two components, such as glass components, but it is unable to bond the components firmly by physical property of the optical clear adhesive while being given a large external impact force. Specifically, there exist some electronic devices, for example, outdoor ATM (Automated Teller Machine), which are put in poor environmental conditions. Therefore, such an electronic device is required to possess strong capability to withstand impact forces. However, the capability of current electronic devices laminated with optical clear adhesives is relatively weak, and is not able to withstand higher impact forces.

In order to enhance capability of withstanding impact force on electronic devices, there exists a need for electronic devices having an enhanced version of adhesive glues to solve the deficiencies existing in foregoing widely-known techniques.

SUMMARY OF THE INVENTION

An objective of the present disclosure is to provide an electronic device with a laminated structure and a manufacturing method thereof, wherein solid-state adhesive glues, possessing certain physical and chemical bonding properties, are selected for making the electronic device with a stronger shock resistance.

Another objective of this disclosure is to provide an electronic device with a laminated structure, comprising:
a first substrate;
a second substrate; and
a solid-state adhesive layer, which is disposed between the first substrate and the second substrate, wherein the solid-state adhesive layer reacts with the first substrate and the second substrate to form a chemically linked chain so as to make the first substrate and the second substrate linked together.

Another objective of this disclosure is to provide a manufacturing method of an electronic device with laminated structure comprising:
disposing a solid-state adhesive layer between a first substrate and a second substrate; and
forming a chemically linked chain between the solid-state adhesive layer and the first substrate and between the solid-state adhesive layer and the second substrate.

Since electronic products manufactured by using technology of the present disclosure are laminated by solid-state adhesive glue having certain physical and chemical properties, these electronic devices have stronger ability of shock resistance. Moreover, material costs of the solid-state bonding adhesives are lower than that of the bonding adhesives used traditionally; thereby reducing production costs further.

BRIEF DESCRIPTION OF THE DRAWINGS

For those skilled in the art numerous embodiments and drawings described below are for illustration purpose only and do not limit the scope of the present disclosure in any manner.

FIG. 3 provides a table, labeled "Table 1", showing experimental result of Sample 1.

FIG. 4 provides a table, labeled "Table 2", showing experimental result of Sample 2.

DETAILED DESCRIPTION OF THE EMBODIMENTS

In accordance with the usual meaning of "a" and "the" in patents, reference, for example, to "a" chemically linked chain or "the" chemically linked chain is inclusive of one or more chemically linked chains. In this application, use of the singular includes the plural and vice versa unless specifically stated otherwise, for example, a term "hydrogen bond" includes singular and plural forms. Section headings used herein are for organizational purposes only, and are not to be construed as limiting the subject matter described.

Detailed description of the present disclosure will be discussed in the following embodiments, which are not intended to limit the scope of the present disclosure, but still can be adapted for other applications. While drawings are illustrated in detail, it would be appreciated that quantity of the disclosed components could be greater or less than disclosed.

In order to make the ordinary technicians skilled in the technical field more familiar with this disclosure, a favorable embodiment of this disclosure is particularly cited in the following context, coupled with attached schemas to illustrate in detail the constituent contents of this disclosure and the efficiency ready for attainment.

Figure 1:
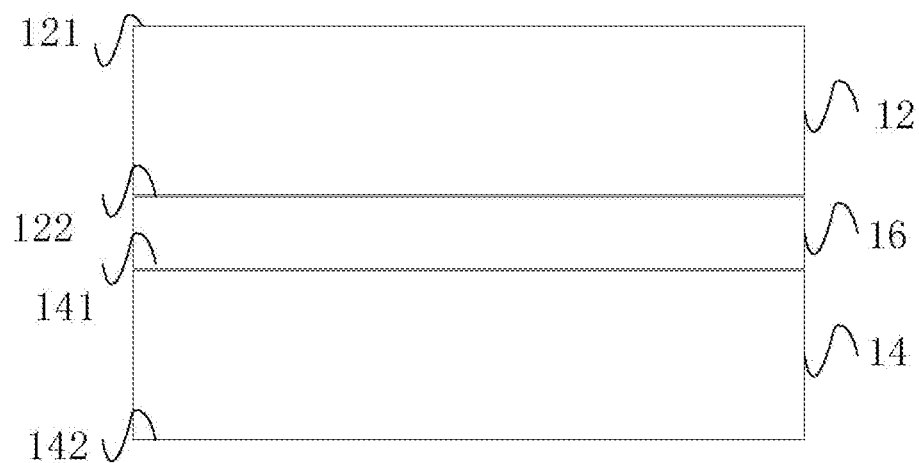
FIG. 1 is a schematic diagram of an electronic device with a laminated structure in accordance with an embodiment of the present disclosure.

As shown in FIG. 1, an electronic device with a laminated structure comprises: a first substrate 12, a second substrate 14 and a solid-state adhesive layer 16. The electronic device, for illustration, is a touch device, and the first substrate 12 can be a touch substrate, which has a first surface 121 and a second surface 122. A touch inductive unit is formed on the first surface 121 of the first substrate 12, while the second surface 122 is laminated with the second substrate 14. The touch inductive units can either be capacitive or resistive. In one embodiment, the capacitive touch inductive unit includes vertical and horizontal axes of inductive electrodes.

The solid-state adhesive layer 16 is disposed between the first substrate 12 and the second substrate 14, wherein the solid-state adhesive layer 16, apart from self stickiness, further reacts with the first substrate 12 on contact surfaces of the first substrate 12 and the second substrate 14. Hydrogen bonds of the solid-state adhesive layer 16 are in combination with the hydrogen bonds of the first substrate and the second substrate to form chemically linked chains and further forming cohesive forces, thereby making the first substrate 12 and the second substrate 14 adhere to each other via the solid-state adhesive layer 16.

The solid-state adhesive layer 16 is a solid-state bonding adhesive such as, PVB (Poly Vinyl Butyral). Tensile strength of the solid-state adhesive layer 16 is more than or equal to 200 $kg/cm^2$ and shrinking rate is less than 3%. These properties make the solid-state adhesive layer 16 sticky, tough and elastic.

When the first substrate 12 is a touch substrate, the second substrate 14 can be a top cover substrate with a first surface 141 and a second surface 142, wherein the first surface 141 is laminated with the second surface 122 of the first substrate 12. In one embodiment, the first substrate 12 and the second substrate 14 are glass substrates. In another embodiment, the electronic device can be a display device, the first substrate can be a display panel, and the second substrate can be an optical component such as an optical polarizer or an optical filter.

Since the solid-state adhesive layer 16 not only possesses favorable physical properties, for instance, stickiness, toughness and elasticity, but also reacts with the first substrate 12 and the second substrate 14 to form cohesive forces, the first substrate 12 and the second substrate 14 bond together firmly. On comparison with electronic devices of the prior art which can not bear the impact force exceeding 12 joules, the electronic device of the present disclosure is capable of bearing greater impact forces such as 20 joules. In addition, even if the electronic products are subjected to the fierce knock resulting in a break, the solid-state adhesive layer 16 will absorb great amount of energy to make fragments attach to the solid-state adhesive layer 16 firmly, and not letting them to diffuse.

FIG. 2A to FIG. 2D show continuous schematic diagrams of a manufacturing method for electronic devices with laminated structures. Components of FIG. 2A to FIG. 2D are similar to FIG. 1.

The manufacturing method for the electronic devices with laminated structures comprises: disposing a solid-state adhesive layer 16 between a first substrate 12 and a second substrate 14; forming a chemically linked chain between the solid-state adhesive layer 16 and the first substrate 12 and further between the solid-state adhesive layer 16 and the second substrate 14. The procedure for forming these chemically linked chains include a heating and pressurizing process, wherein these chemically linked chains are formed by linking hydrogen bonds.

Figure 2A:
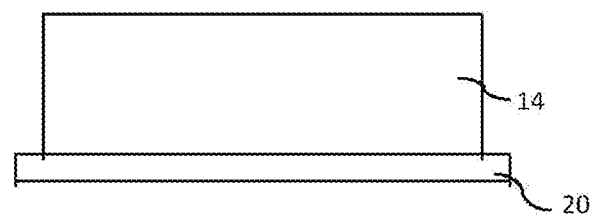
FIG. 2A to FIG. 2D are continuous schematic diagrams of manufacturing methods for electronic devices with laminated structures in accordance with an embodiment of the present disclosure.
Figure 2B:
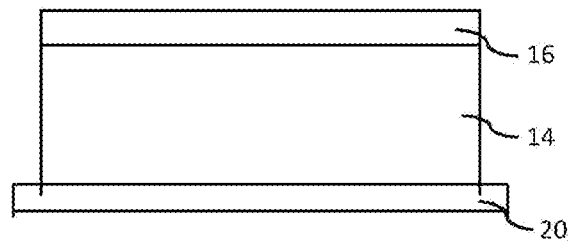

In FIG. 2A, a second substrate 14 is placed on a fixture 20 which is used for fixing the location of the second substrate 14 such that the second substrate 14 will not slide while being laminated. In FIG. 2B, the solid-state adhesive layer 16 is disposed on the second substrate 14, wherein the solid-state adhesive layer 16 can be PVB adhesive layers. The solid-state adhesive layer 16 possesses tensile strength more than or equal to 200 $kg/cm^2$ and shrinking rate less than 3%.

Figure 2C:
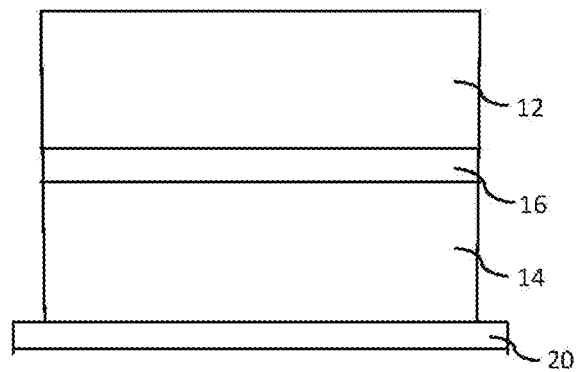

In FIG. 2C, the first substrate 12 is disposed on the solid-state adhesive layer 16, wherein the first substrate 12, the solid-state adhesive layer 16, and the second substrate 14 can be located and fixed by the fixture 20.

Figure 2D:
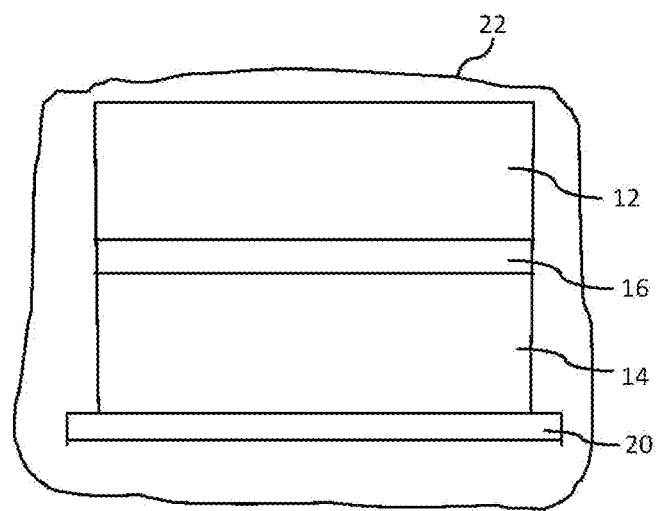

In FIG. 2D, the fixed first substrate 12, the solid-state adhesive layer 16, and the second substrate 14, accompanied by the fixture 20, are put together into a vacuum packaging bag to go through a vacuum packing machine (not shown).

Next, by a cool-exhaust and a heat-exhaust manufacturing process, air is excluded from the spaces between the solid-state adhesive layer 16 and the first substrate 12; and between the solid-state adhesive layer 16 and the second substrate 14. In an implementation, the vacuum degree by reduced pressure is above 650 mmHg, cool-exhaust temperature is below 25° C., and the cool-exhaust time is above 15 min. The temperature of the substrate surface during heat-exhaust is required to reach 70~120° C., with the heat-exhaust time being above 30 min.

The packaged first substrate 12, the solid-state adhesive layer 16, and the second substrate 14, accompanied by the fixture 20, are put together into a high-pressure furnace (not shown), and then the furnace door is closed. The internal temperature within the furnace is warmed up firstly to reach 45° C. and then heated and pressurized simultaneously. The warming speed is controlled at 5° C./min and the pressurizing speed is controlled at 0.06 MPa/min. When the temperature reaches 120° C.-140° C. and the pressure reaches 1.0-1.5 MPa, heat and pressure are maintained for 30-60 min, and then the temperature is reduced to 45° C. but the pressure is maintained throughout. Finally, the internal pressure is discharged to the atmosphere, such that the high-temperature molding process is finished. The pressurizing and pressure-discharging temperatures can be controlled to avoid generation of bubbles in the substrate periphery. Therefore, the first substrate 12, the solid-state adhesive layer 16, and the second substrate 14 are pressurized and heated by the high-temperature furnace to form chemically linked chains between the solid-state adhesive layer 16 and the first substrate 12 and between the solid-state adhesive layer 16 and the second substrate 14. Illustratively, the hydrogen bonds between SiOH of the glass substrate and COH base of the adhesive layer are formed into the chemically linked bonds.

The first substrate 12, the solid-state adhesive layer 16, and the second substrate 14 in the high-pressure furnace are cooled, and then the first substrate 12, the solid-state adhesive layer 16, the second substrate 14, and the fixture 20, which are vacuum packaged, are taken out of the high-pressure furnace.

Next, the vacuum packaged bag containing the first substrate 12, the solid-state adhesive layer 16, the second substrate 14, and the fixture 20 are removed. Next the fixture 20 and the redundant solid-state adhesive layer 16, overflowing from the edges of the first substrate 12 and the second substrate 14, is wiped off by objects such as blades to finish the lamination process.

Conventionally, people usually use physical properties of the optical adhesives for bonding two components, but the adhesive is unable to bond firmly unless a large external impact force with limited capability of shock resistance is applied. However, the solid-state adhesives possess properties such as physical and chemical cohesiveness and stronger capability of shock resistance thereby making the electronic devices much stronger.

Compared with the existing solid-state optical adhesives, such as PSA, while deforming glass substrates and the solid-state optical adhesives by pressure, the adhesives can extrude bubbles between the glass substrates and the solid-state adhesives, but some thickened large-scale glass substrates are not easy to deform while being laminated. This leads to incomplete extrusion of bubbles and low product yield. This disclosure adopts the techniques of cool-exhaust, heat-exhaust, heating and pressurizing to laminate glasses and exclude bubbles without deformations of the glass substrates. Thus the present disclosure is applicable to the lamination of large-scale and small-scale glass substrates, for illustrations, the method of this disclosure can be applicable to lamination of 23 inches glass.

Moreover, the low material cost of PVB adhesives employed in the disclosure only takes 1/20 of the optical adhesives applied to the laminations in the conventional touch screen field, thereby reducing the manufacturing costs of products.

The following gives a test of the capability of shock resistance of the electronic devices produced by technique of the present disclosure, such as a touch panel, wherein Sample 1 is a conventional touch panel, and Sample 2 is a touch panel produced by the technique of the present disclosure. Material and thickness of the first substrate and the second substrate of the two samples are the same, namely, the material is a glass, and the thickness of the first substrate and the second substrate are 3.2 cm and 4.0 cm, respectively. The sole distinction between Sample 1 and Sample 2 is that the material of adhesive layers between the first substrate and the second substrate is different, wherein Sample 1 is a conventional adhesive such as a PSA adhesive layer, and Sample 2 is an adhesive employed in the present disclosure such as a PVB adhesive layer. The main purpose of this test is to measure maximum height that the sample can bear before being broken by dropping a small ball from a certain height to hit the Sample 1 and Sample 2, respectively, thereby measuring the capability of shock resistance. The testing results observed are shown in Table 1 and Table 2, (provided in FIG. 3 AND FIG. 4, respectively), wherein Table 1 is experimental result of Sample 1, and Table 2 is experimental result of Sample 2. On comparison between the results of Table 1 and Table 2, it can be found that Sample 1 is broken when the small ball drops from 40 cm height, but the sample 2 is still good even if the small ball drops from the height of 50 cm or even much higher, for example, the height of 125 cm. Thus the capability of shock resistance of the electronic device with laminated structure is better than, even three times as that of the conventional electronic device.

The advantage of the present disclosure is to provide an electronic device with laminated structure and a manufacturing method thereof, adopting solid-state adhesives with both physical and chemical cohesiveness. The present disclosure enables an electronic device to have much stronger capability of shock resistance and reduce material costs.

While certain embodiments have been shown and described, various modifications and substitutions may be made thereto without departing from the spirit and scope of the disclosure. Therefore, it is to be understood that the present disclosure has been described by way of illustration and not limitations.

What is claimed is:

1. A manufacturing method for an electronic device with a laminated structure, comprising:
   disposing a solid-state adhesive layer between a first substrate and a second substrate; and
   forming chemical bonds between the solid-state adhesive layer and the first substrate and between the solid-state adhesive layer and the second substrate, wherein forming the chemical bonds comprises:
   vacuum-packaging the first substrate, the solid-state adhesive layer, and the second substrate;
   placing the vacuum-packaged first substrate, the solid-state adhesive layer, and the second substrate into a furnace;
   heating the furnace to a first temperature with the first substrate, the solid-state adhesive layer, and the second substrate in the furnace;
   responsive to the furnace being heated to the first temperature, simultaneously pressurizing and heating the furnace to increase an internal pressure from an atmospheric pressure to a second pressure greater than the atmospheric pressure and to increase a temperature of the furnace from the first temperature to a second temperature greater than the first temperature;
   maintaining the second pressure and the second temperature;
   cooling the furnace to the first temperature from the second temperature while the second pressure is maintained; and
   reducing the internal pressure to less than the second pressure responsive to the furnace being cooled to the first temperature.

2. The manufacturing method of claim 1, wherein reducing the internal pressure to less than the second pressure comprises:
   returning the internal pressure of the furnace from the second pressure to the atmospheric pressure.

3. The manufacturing method of claim 1, wherein vacuum-packaging the first substrate, the solid-state adhesive layer, and the second substrate comprises:
   placing the first substrate, the solid-state adhesive layer, and the second substrate into a vacuum packaging bag;
   connecting the vacuum packaging bag to a source of vacuum; and
   conducting a cool-exhaust and heat-exhaust process to exclude air from spaces between the solid-state adhesive layer and the first substrate and between the solid-state adhesive layer and the second substrate.

4. The manufacturing method of claim 3, wherein conducting the cool-exhaust and heat-exhaust process comprises:
   cooling the first substrate to a temperature below 25° C. while applying a pressure within the vacuum packaging bag of at least 650 mmHg; and
   heating the first substrate to a temperature of more than or equal to 70° C. and less than or equal to 120° C.

5. The manufacturing method of claim 1, wherein simultaneously pressurizing and heating the furnace to increase the internal pressure from the atmospheric pressure to the second pressure greater than the atmospheric pressure and to increase the temperature of the furnace from the first temperature to the second temperature greater than the first temperature comprises:
   simultaneously pressurizing the furnace at a rate of about 0.06 MPa/min and heating the furnace at a rate of about 5° C./min.

6. The manufacturing method of claim 1, wherein the chemical bonds are hydrogen bonds.

7. The manufacturing method of claim 1, wherein the solid-state adhesive layer is a PVB adhesive layer.

8. The manufacturing method of claim 1, wherein the solid-state adhesive layer has a tensile strength of more than or equal to 200 kg/cm$^2$.

9. The manufacturing method of claim 1, wherein the solid-state adhesive layer has a shrinking rate of less than 3%.

10. The manufacturing method of claim 1, wherein the electronic device is a display device.

11. The manufacturing method of claim 1, wherein the first substrate comprises a touch inductive unit comprising a first-axis inductive electrode and a second-axis inductive electrode on a surface thereof.

12. The manufacturing method of claim 1, wherein the second substrate comprises at least one of an optical polarizer or an optical filter.

13. The manufacturing method of claim 1, wherein maintaining the second pressure and the second temperature comprises:
   maintaining the internal pressure of the furnace at the second pressure and maintaining the temperature of the furnace at the second temperature for a specified duration of time.

14. The manufacturing method of claim 13, wherein the specified duration of time is more than or equal to 30 minutes and less than or equal to 60 minutes.

15. The manufacturing method of claim 1, wherein:
   the second pressure is more than or equal to 1.0 MPa and less than or equal to 1.5 MPa, and
   the second temperature is more than or equal to 120° C. and less than or equal to 140° C.

16. A manufacturing method for an electronic device with a laminated structure, comprising:
   placing a first substrate, a solid-state adhesive layer, and a second substrate into a vacuum packaging bag and vacuuming the vacuum packaging bag;
   placing the vacuum packaging bag comprising the first substrate, the solid-state adhesive layer, and the second substrate into a furnace;
   heating the furnace to a first temperature with the vacuum packaging bag comprising the first substrate, the solid-state adhesive layer, and the second substrate in the furnace, wherein the first temperature is less than 50° C.;
   responsive to the furnace being heated to the first temperature, simultaneously pressurizing and heating the furnace to increase an internal pressure from an atmospheric pressure to a second pressure greater than the atmospheric pressure and to increase a temperature of the furnace from the first temperature to a second temperature greater than the first temperature;
   maintaining the second pressure and the second temperature;
   cooling the furnace to the first temperature from the second temperature while the second pressure is maintained; and
   chemically bonding the first substrate with the solid-state adhesive layer and chemically bond the second substrate with the solid-state adhesive layer.

17. The manufacturing method of claim 16, wherein simultaneously pressurizing and heating the furnace to increase the internal pressure from the atmospheric pressure to the second pressure greater than the atmospheric pressure and to increase the temperature of the furnace from the first temperature to the second temperature greater than the first temperature comprises:
   simultaneously pressurizing the furnace at a rate of about 0.06 MPa/min and heating the furnace at a rate of about 5° C./min.

18. The manufacturing method of claim 16, wherein maintaining the second pressure and the second temperature comprises:
   maintaining the internal pressure of the furnace at the second pressure and maintaining the temperature of the furnace at the second temperature for a specified duration of time, wherein the specified duration of time is more than or equal to 30 minutes and less than or equal to 60 minutes.

19. The manufacturing method of claim 16, wherein placing the first substrate, the solid-state adhesive layer, and the second substrate into the vacuum packaging bag and vacuuming the vacuum packaging bag comprises:
   conducting a cool-exhaust and heat-exhaust process to exclude air from spaces between the solid-state adhesive layer and the first substrate and between the solid-state adhesive layer and the second substrate.

20. The manufacturing method of claim 19, wherein conducting the cool-exhaust and heat-exhaust process comprises:
   cooling the first substrate to a temperature below 25° C. while applying a pressure within the vacuum packaging bag of at least 650 mmHg; and
   heating the first substrate to a temperature of more than or equal to 70° C. and less than or equal to 120° C.

\* \* \* \* \*